(12) United States Patent
Plaghki (10) Patent No.: US 11,333,900 B2
(45) Date of Patent: May 17, 2022

(54) EYEWEAR SYSTEM FOR LENS EXCHANGE

(71) Applicant: Materialise N.V., Leuven (BE)

(72) Inventor: Roman Plaghki, Leuven (BE)

(73) Assignee: Materialise N.V., Leuven (BE)

( * ) Notice: Subject to any disclaimer, the term of this patent is extended or adjusted under 35 U.S.C. 154(b) by 121 days.

(21) Appl. No.: 16/651,094

(22) PCT Filed: Oct. 4, 2018

(86) PCT No.: PCT/US2018/054439
§ 371 (c)(1),
(2) Date: Mar. 26, 2020

(87) PCT Pub. No.: WO2019/071025
PCT Pub. Date: Apr. 11, 2019

(65) Prior Publication Data
US 2020/0241318 A1    Jul. 30, 2020

Related U.S. Application Data

(60) Provisional application No. 62/568,482, filed on Oct. 5, 2017.

(51) Int. Cl.
*G02C 5/12* (2006.01)
*G02C 1/08* (2006.01)

(52) U.S. Cl.
CPC ............. *G02C 5/126* (2013.01); *G02C 1/08* (2013.01); *G02C 5/122* (2013.01)

(58) Field of Classification Search
CPC .......... G02C 5/122; G02C 5/126; G02C 5/12; G02C 1/08
See application file for complete search history.

(56) References Cited

U.S. PATENT DOCUMENTS 7,431,451 B1    10/2008    Lin

FOREIGN PATENT DOCUMENTS

| CA | 2480532 A1 | 3/2006 | |
|----|------------|--------|--|
| DE | 144718 A * | 11/1980 | |
| DE | 144718 A | 11/1980 | |
| FR | 2800173 A1 * | 4/2001 | ............... G02C 1/08 |
| FR | 2800173 A1 | 4/2001 | |
| FR | 2818394 A1 | 6/2002 | |
| WO | 2014126078 A1 | 8/2014 | |

OTHER PUBLICATIONS

Machine translation of DD144718A retrieved from Google Patents Sep. 23, 2021 (Year: 2021).*

\* cited by examiner

*Primary Examiner* — Cara E Rakowski
(74) *Attorney, Agent, or Firm* — Patterson + Sheridan, LLP

(57) ABSTRACT

The present disclosure relates to an eyewear assembly that is configured for fast and easy removal or exchange of lenses. The eyewear assembly comprises a connector that may be inserted into a frame front in order to hold the lenses in place, and removed from the frame front in order to release the lenses.

13 Claims, 8 Drawing Sheets

EYEWEAR SYSTEM FOR LENS EXCHANGE

CROSS-REFERENCE TO RELATED APPLICATIONS

This application claims the benefit of U.S. Provisional Patent No. 62/568,482, filed Oct. 5, 2017. The content of the provisional application is hereby incorporated by reference in its entirety.

BACKGROUND OF THE INVENTION

Field of the Invention

The field of the invention relates generally to eyewear, and more particularly, to eyewear having a mechanism for easy and convenient exchange of lenses.

Description of the Related Technology

For eyewear users, it may be desirable to exchange or replace lenses in the eyewear. Some users may exchange or replace lenses when they need new lenses for vision correction, while others may regularly exchange their lenses depending on the light conditions or intended usage for the eyewear. For users who wear eye protection for sports or for occupational hazards such as flying objects, chemicals, or high intensity light, it may be necessary to replace lenses frequently when the lenses become damaged or worn. For all of these reasons, there is a need in the art for eyewear frames that are suitable for exchanging or replacing lenses in a manner that is fast and convenient.

Conventional solutions are based on hinges with a quick open-close mechanism built into the eyewear frame to secure and release lenses, external clamps that reversibly hold together the eyewear frame and lenses, or special one-piece lenses that are clipped to a frame at the nosepiece or hinges. While these solutions may be suitable for specific eyewear designs, the specialized design elements are not easily adapted to other frame styles or new eyewear shapes. Thus, there remains a need in the art for an eyewear system that not only enables a user to change lenses easily, but is suitable for incorporating into a variety of frames.

SUMMARY

A first aspect of the present disclosure relates to an eyewear assembly comprising a frame front comprising two rim segments, wherein each rim segment comprises a notch and a free end, and wherein each rim segment is configured to move between at least two positions comprising a first open position in which the rim segment is configured for removal or insertion of a lens, and a second closed position in which the rim segment is configured for holding the lens in place; and a connector comprising two beams, each beam having a first end, a second end, and a lip, wherein the two beams are coupled to each other at their first ends; and the two beams are configured to reversibly hold the two rim segments of the front frame in the second closed position by engaging the lip on each beam with the notch on each rim segment.

The frame front may be a single, one-piece object.

In certain embodiments, the frame front further comprises an opening configured to receive a portion of the connector and a portion of each of the two rim segments. The frame front may comprise two interior ledges that are complementary to a surface on each of the free ends of the two rim segments. The surface on each of the free ends may be configured to press against each of the two interior ledges when the two rim segments are positioned in the second closed position. The surface on each of the free ends may be angled.

The two rim segments may be configured to move independently of each other from the first open position to the second closed position.

The two beams of the connector may be configured to move towards one another when pressure is applied in a medial direction to at least one of the two beams.

In some embodiments, pressure applied in a medial direction causes the lip on each of the two beams to disengage from the notch on each of the two rim segments, thereby releasing the two rim segments of the front frame from the second closed position.

Each of the two beams may comprise a first portion and a second portion. The first portion may comprise a groove extending along at least a part of its length, while the second portion may be configured to form a nosepad.

The eyewear assembly may comprise a securing means on at least one of the two beams or on the rim segments, wherein the means are configured to secure the two beams to the sides of the rim segments. The securing means may comprise a protrusion on each one of the two beams or on the rim segments, the protrusion being configured to block further lateral movement of the two beams.

BRIEF DESCRIPTION OF THE DRAWINGS

FIGS. 1A-1D show a portion of the frame front, as viewed from the posterior side.

FIGS. 2A-2D show the frame front, as viewed from the anterior side.

FIGS. 3A-3D show different views of a portion of a rim segment.

FIGS. 4A-4C show different views of the connector.

FIGS. 5A-5M show variations of the connector. In one configuration (FIGS. 5A-5C), the connector slides into the frame front and engages securely with a hook mechanism. In another configuration (FIGS. 5D-5G), the connector has a c-shaped portion that snaps securely onto a corresponding portion of the frame front. A similar configuration is shown in FIGS. 5H-5K, where the connector has three prongs that fit into corresponding openings in the frame front. An additional configuration is shown in FIGS. 5L-5M, in which the connector is a piece that connects with the frame front to form a complete frame.

DETAILED DESCRIPTION OF CERTAIN INVENTIVE EMBODIMENTS

Embodiments of this application relate to an eyewear assembly suited for exchanging or replacing lenses. The eyewear assembly may be configured to move between at least two positions comprising a first open position in which a rim segment is configured for removal or insertion of a lens, and a second closed position in which the rim segment is configured for holding the lens in place. The eyewear assembly may comprise a reversible fastening mechanism located at one or more of a bridge of the eyewear assembly, a temple of the eyewear assembly, and a position along a rim segment of the eyewear assembly, for example, at a bottom inner portion near a nosepad. The reversible fastening mechanism may comprise screws, like the screws that hold eyewear rims together in traditional frames. The reversible fastening mechanism may comprise a lock, clamp, snap connector, hasp, envelope flap, click elements, sliding elements, or other mechanisms that facilitate unfastening and refastening easily, for example, without using extra tools. In certain embodiments, the eyewear assembly configured for interchanging lenses may comprise as few as two parts, which simplifies the mechanisms of pins and clips and brackets found in other eyewear assemblies, and saves the user time and hassle.

A first aspect of the present disclosure relates to an eyewear assembly comprising a frame front comprising two rim segments, wherein each rim segment comprises a notch and a free end, and wherein each rim segment is configured to move between at least two positions comprising: a first open position in which the rim segment is configured for removal or insertion of a lens, and a second closed position in which the rim segment is configured for holding the lens in place; and a connector comprising two beams, each beam having a first end, a second end, and a lip, wherein the two beams are coupled to each other at their first ends; and the two beams are configured to reversibly hold the two rim segments of the front frame in the second closed position by engaging the lip on each beam with the notch on each rim segment. The two rim segments may be separate structures from each other that are not connected, or the rim segments may be joined together to form a continuous one-piece rim segment.

Figure 1A:
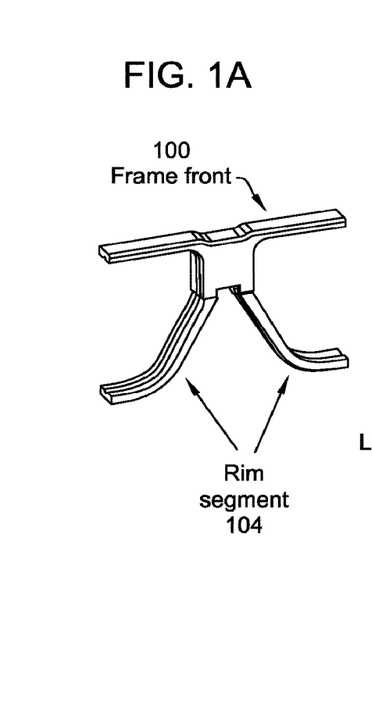
FIG. 1A shows the portion of the frame assembly without lenses.

FIGS. 1A-1D illustrate an exemplary embodiment of the eyewear assembly. FIG. 1A is a rear view showing the posterior side of a portion of the frame front (100), when no lenses are present. The posterior side of the frame front is the side that will be closest to the user's face when the user is wearing the eyewear. The frame front may comprise rim segments (104) that are configured to encircle the entire lenses. The rim segments may be configured to encircle only a portion of the lens, for example, the rim segments may contact only the top edge of the lens or may contact only at specific points selected for support and/or aesthetic effect.

Figures 1B, 1C:
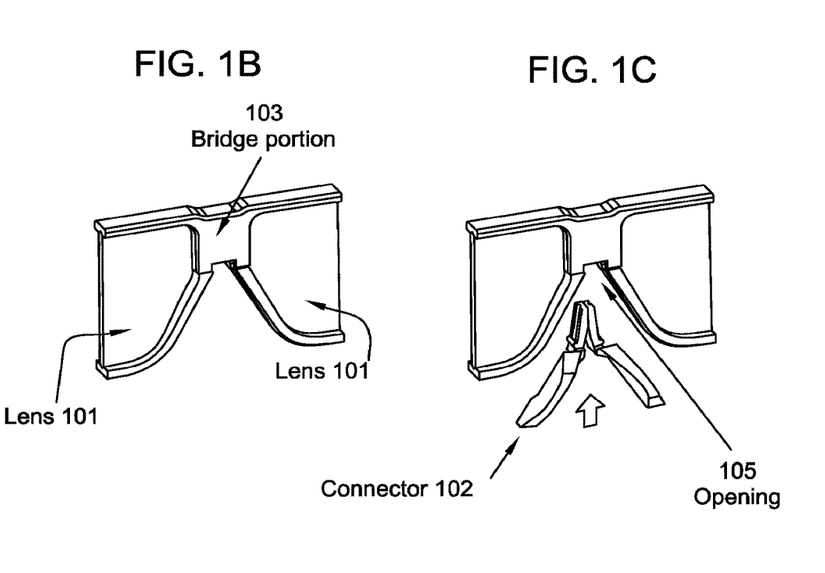
FIG. 1B shows the portion of the frame assembly with lenses.
FIG. 1C shows a connector before it is engaged with the rim segments of the frame front.
Figure 1D:
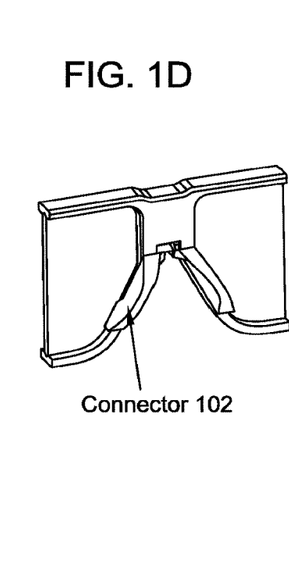
FIG. 1D shows the connector after it has been inserted in place and engaged with the rim segments of the frame front.

FIGS. 1B-1D show a rear view (posterior side) of the portion of the frame front (100), with lenses (101) in place. In FIG. 1C, the connector (102) is shown outside and below the frame front, with an arrow showing the direction in which the connector will be inserted into an opening (105) in the frame front. In FIG. 1D, a portion of the connector (102) is positioned within the frame front.

The frame front may be a single, one-piece object. The frame front may further comprise hinges, which may connect the frame front to other components of eyewear, such as temples. The frame front may comprise nosepads that are either built into the frame front, or are connected to the frame front through nosepad arms.

In certain embodiments, the frame front comprises an opening configured to receive a portion of the connector and a portion of each of the two rim segments. The frame front may comprise a bridge portion (103). The bridge portion may be positioned at the center of the eyewear assembly, for example, in between the two rim segments. The bridge portion may have an opening configured to receive a portion of the connector. The opening in the frame front or in the bridge portion may be configured to accommodate the free ends of the rim segments, or may be configured to accommodate both the portion of the connector and the rim segments and any fastening mechanism that may be built into one or both parts. In some embodiments, the bridge portion may have a cover so that the portion of the connector and/or the rim segments in the opening are not visible when the eyewear assembly is viewed from the front (or anterior) side.

In certain embodiments, the frame front further may comprise interior structures, such as an interior ledge. The frame front may comprise two interior ledges that are complementary to a surface on each of the free ends of the two rim segments. The surface on each of the free ends may be configured to press against each of the two interior ledges when the two rim segments are positioned in the second closed position. In certain embodiments, the surface on each of the two free ends is angled, for example, so that the two free ends press against the interior ledges at a non-horizontal angle.

Figure 2A:
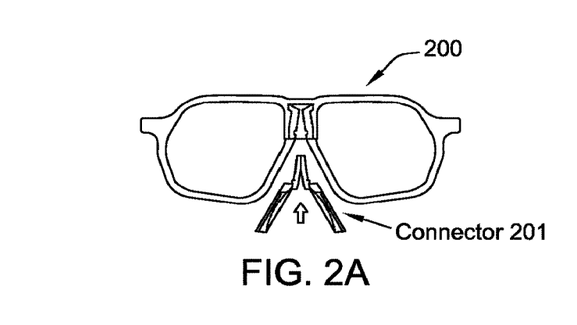
FIGS. 2A and 2B show the front frame before (FIG. 2A) and after (FIG. 2B) the connector is engaged.
Figure 2B:
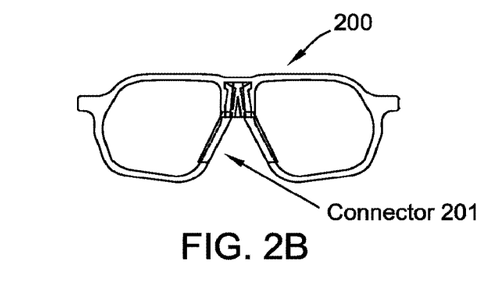

FIGS. 2A-2D illustrate an exemplary mechanism whereby the rim segments interact with the connector. In FIG. 2A, the connector (201) is positioned outside of and below the frame front (200). In FIG. 2B, a portion of the connector (201) is positioned within the frame front to secure the eyewear assembly in a closed position, where lenses positioned in the rim segments are held in place.

Figure 2C:
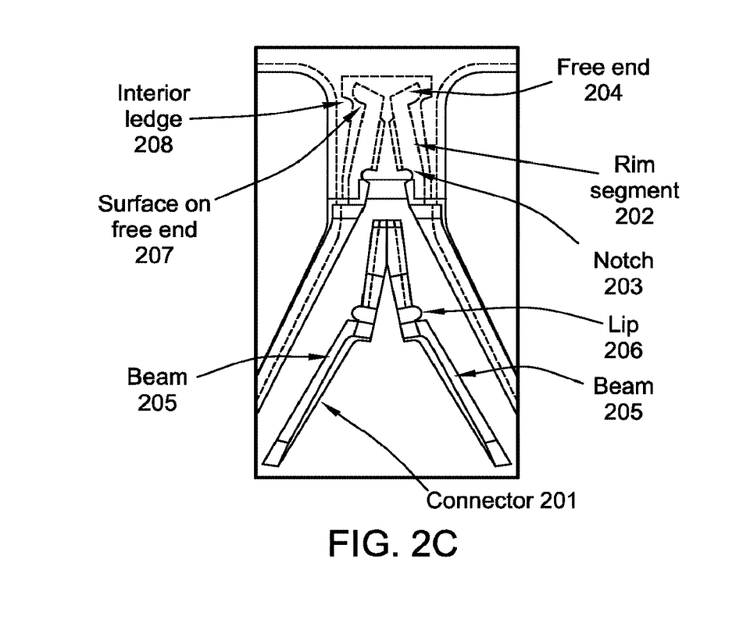
FIGS. 2C and 2D show the interior configuration of the rim segments and connector before (FIG. 2C) and after (FIG. 2D) the connector is engaged.
Figure 2D:
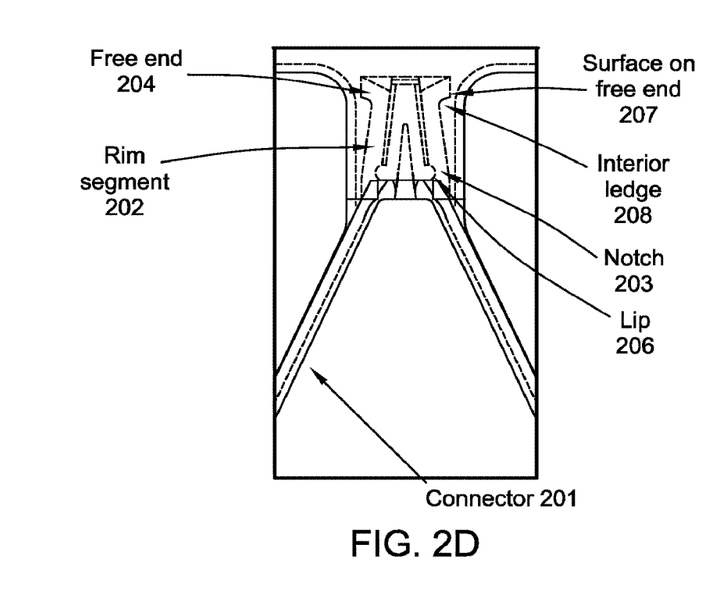

FIG. 2C shows a close-up view of an exemplary connector that is positioned outside of and below the frame front. FIG. 2D shows a close-up view of the exemplary connector after a portion has been inserted into the frame front. In this view, a portion of the two beams of the connector (201) are configured to hold the rim segments (202) in a closed position by engaging the lip (206) on each beam with the notch on each rim segment (203). In addition, the free end of each rim segment (204) is secured in the frame front because a surface (207) on the free end is pressed against an interior ledge (208) of the frame front. This surface (207) is angled, as is the corresponding interior ledge (208), and the interface between the surface and the ledge may be non-horizontal.

The frame front may comprise one or more rim segments, for example, two rim segments, wherein each rim segment comprises a notch and a free end, and wherein each rim segment is configured to move between at least two positions comprising: a first open position in which the rim segment is configured for removal or insertion of a lens, and a second closed position in which the rim segment is configured for holding the lens in place. A rim segment may comprise one or more additional elements, which may be present on one or both of the rim segments. In some embodiments, a rim segment comprises a surface on the free end, wherein the surface is angled. This angled surface may form an interface with a complementary interior ledge in the frame front.

In certain embodiments, a rim segment comprises at least a first portion and a second portion. The first portion, which may comprise a free end, may be configured to fit inside an opening in the frame front, for example, inside an opening in a bridge portion of the frame front. The first portion of the rim segment may be configured to interact with a first portion of a connector. The second portion of the rim segment may be configured to remain outside of the opening in the frame front. The second portion may extend around an outer edge of a lens, or around a portion of the outer edge of a lens. The second portion of the rim segment may be configured to outline the entire frame front, or may be joined to another rim segment.

In certain embodiments, the first portion of the rim segment comprises a guide. This guide may be configured to conform to a complementary groove in the first portion of a beam on a connector. The guide may extend along the entire length of the first portion of the rim segment, or along part of the length of the first portion of the rim segment.

The first and second portions of the rim segment may be a single one-piece structure, or may comprise two or more pieces joined together. In some embodiments, the first portion of the rim segment comprises a free end that is not connected to other structures and a base end that is connected to the second portion of the rim segment. The base end may be a wide structure, for example, having a larger cross sectional area than other parts of the first portion. This larger base end may be configured to secure the rim segment in the opening of the frame front and prevent unwanted movement of the rim segment, such as movement in an anterior-posterior direction.

The two rim segments of the frame front may be configured to move independently of each other from the first open position to the second closed position. Each rim segment may be inserted into or removed from the opening of the frame front independently of the other. In some embodiments, a first open position may be a position in which the rim segments are pulled entirely out of the opening of the frame front, so that the free end of the rim segment is also pulled out of the opening of the frame. Alternatively, a first open position may be a position in which the rim segment and/or free end of the rim segment is still partially inside the opening in the frame front, but is loose enough to remove or insert a lens. In some embodiments, the free ends of the two rim segments may be connected to one another, so they move together as one piece.

The rim segments may be in the second closed position only when the connector has engaged with the rim segments. The rim segments may be in the second closed position when one or both rim segments have been inserted in the opening in the frame front and engaged with elements in the interior of the frame front, such as interior ledges. In some embodiments, the rim segment has at least one hook or barb which is configured to engage with corresponding indentations on the interior of the frame front and hold the rim segment in the second closed position. The connector may then be used to further lock or secure the rim segments in the second closed position.

Figure 3A:
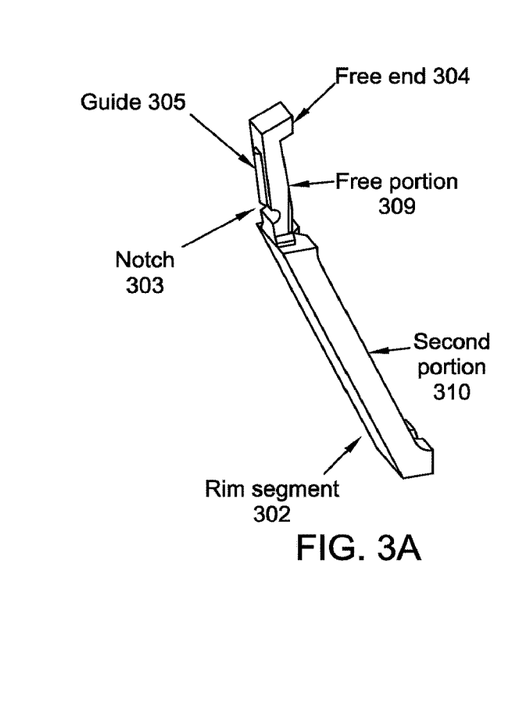
FIG. 3A is a perspective view.
Figure 3B:
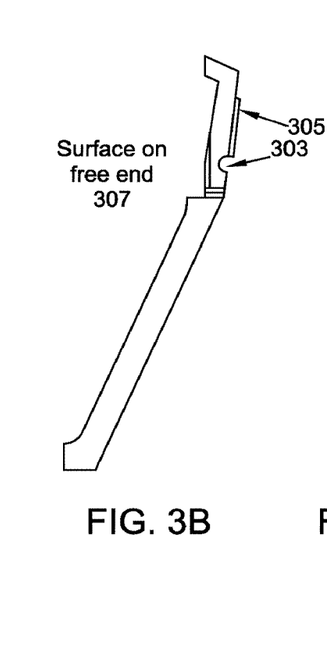
FIG. 3B shows a view of one rim segment viewed from the posterior side.
Figure 3C:
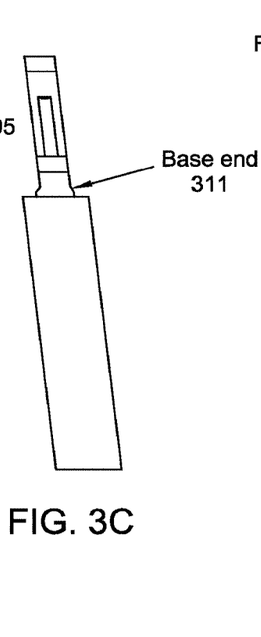
FIG. 3C shows a view from the lateral side of one rim segment.
Figure 3D:
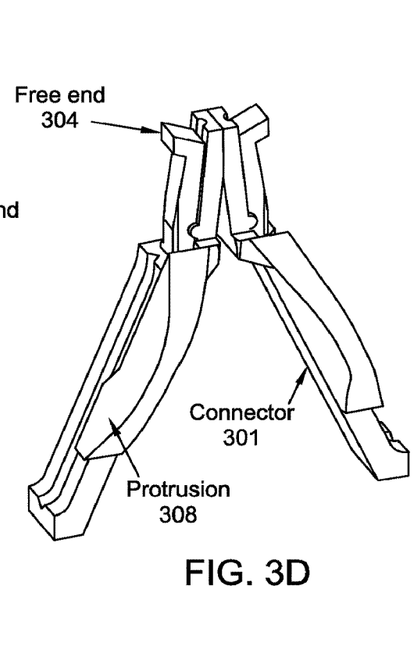
FIG. 3D shows a connector positioned in between two rim segments.

FIGS. 3A-3D illustrate an exemplary rim segment (302). FIG. 3A is a perspective view of the rim segment, showing the first portion (309) of the rim segment, the second portion of the rim segment (310), the notch (303), the free end (304), and a guide (305). FIG. 3B is a back view of the rim segment. In FIG. 3C, a side view of the connector from the outer side, an exemplary base end (311) of the first portion of the rim segment is visible. FIG. 3D shows a perspective view of two rim segments that are engaged with a connector (301). The connector has a protrusion (308) that contacts the rim segment in order to reduce or eliminate movement of the rim segment and connector relative to each other. The protrusion is an example of a securing means, which may be present on at least one of the two beams of the connector or on the rim segment. The securing means are configured to block lateral movement of the beam relative to the rim segment.

A connector may comprise one beam, or may comprise more than one beam. A connector may comprise two beams, each beam having a first end, a second end, and a lip, wherein the beams may be coupled to each other at their first ends. The two beams may be configured to reversibly hold the two rim segments of the front frame in a closed position by engaging the lip on each beam with the notch on each rim segment. In some embodiments, the two beams in the connector may be identical to each other. The two beams may be different from one another. A beam may be a straight beam or a curved beam. A beam may be uniform in width or height along its length, or may be non-uniform. For example, a non-uniform beam may have a first portion that is straight and a second portion that is curved. A non-uniform beam may comprise a first portion and a second portion, wherein the first and second portions have a different size, shape, or geometry from each other. The first and second portions of the beam may be a single piece, or may be two pieces joined together. In certain embodiments, each beam comprises at least two portions. A first portion of a beam may be inserted into the frame front, while a second portion of the beam may remain outside of the frame front. In some embodiments, a second portion of the beam that remains outside of the frame front is configured to form a nosepad to support the frame front against a user's nose.

A connector may further comprise elements on one or both of the beams. In some embodiments, a beam comprises at least a first portion and a second portion, wherein the first portion has a groove extending along the length of the first portion in the direction of the beam. The groove may extend along the full length of the first portion, or along only a portion of the length of the first portion. The groove may be configured to conform to a guide located on the rim segment. This interaction may ensure a secure fit between the beam and the rim segment and thereby reduce or eliminate movement of these two structures in an anterior-posterior direction.

In certain embodiments, the first portion of the beam comprises at least one angled edge that is configured to form an angled interfaced with a rim segment. One or more angled interfaces between the beam and a rim segment may reduce or eliminate play and unwanted movement between these structures. In some embodiments, a beam may comprise a second portion, wherein the second portion comprises a securing means that is configured to secure the beam to the rim segment. A securing means may be a protrusion on the beam that is configured to interact with a rim segment, for example, to brace the second portion of the beam against rim segment and reduce or eliminate play (such as lateral movement) between these structures. The securing means may also be placed on the frame front, at any location where the beams may be braced.

Figure 4A:
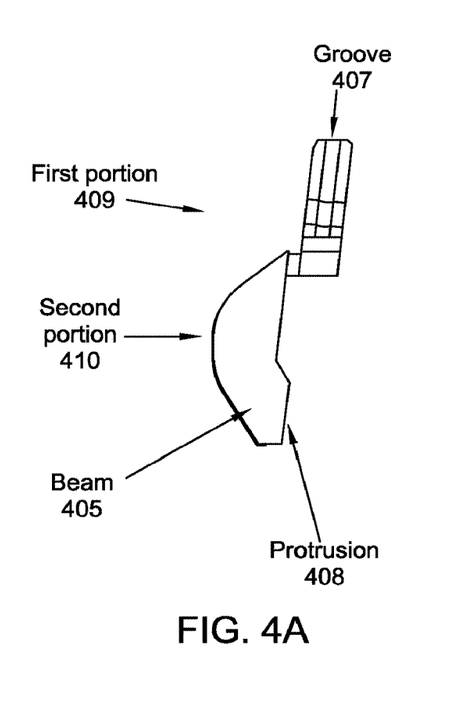
FIG. 4A shows a side view of the outer side of the connector.
Figure 4B:
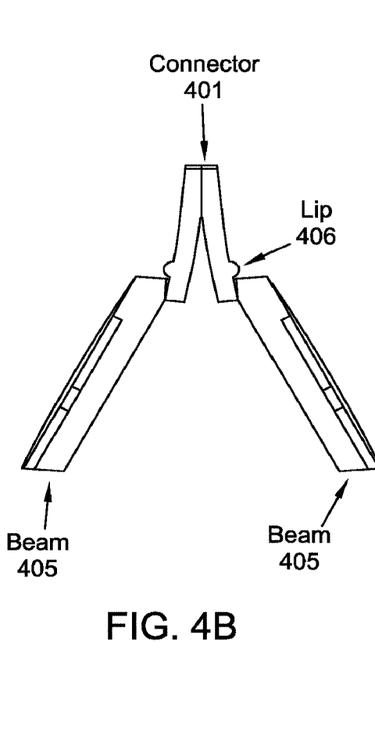
FIG. 4B shows a view from the posterior side.
Figure 4C:
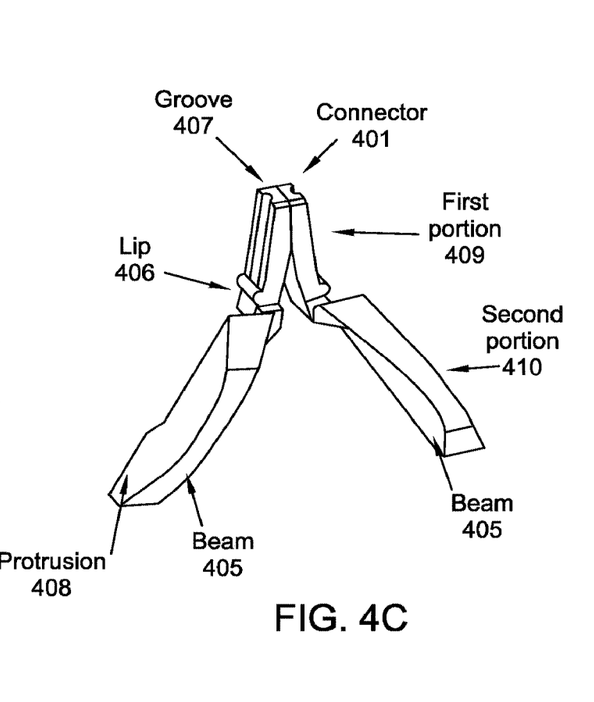
FIG. 4C is a perspective view of the connector.

FIGS. 4A-4C illustrate an exemplary connector (401) comprising two beams (405). FIG. 4A is a side view of the connector from the outer side, where only one of the beams is visible. The beam is non-uniform and comprises a first portion (409) and a second portion (410). The first portion (409) can be inserted into the frame front and interact with a rim segment. The first portion comprises a groove (407). The second portion (410) can remain outside of the frame front. FIG. 4B is a back view of the connector, showing that the two beams (405) are coupled at one end to form a single connector, and that each beam has a lip (406). FIG. 4C is a perspective view of the connector, where the lip (406), groove (407), and protrusion (408) are visible. In this exemplary connector, the second portion of the beam (410) is configured as a nosepad.

In some embodiments, the eyewear assembly comprises a separate pair of nosepads or nosepad arms which may also be inserted into the opening in the frame front and secured with the connector.

In certain embodiments, the two beams of the connector are configured to move towards each other when pressure is applied in a medial direction to at least one of the two beams. This pressure may cause the lip on each of the two beam segments to disengage from their position in the notch on each of the two rim segments, thereby releasing the two rim segments from the second closed position. The connector may be removed from the opening the frame front while the rim segments are further opened and the lenses are removed or exchanged.

A further aspect of this disclosure relates to variations on the eyewear assembly, rim segments, and/or connector. In some embodiments, the frame front may comprise a support structure that is configured to connect two lenses, but there is no opening in the frame front or bridge portion. In some embodiments, a connector is configured to clip on, click in, snap in, or grab onto a portion of the frame front. FIGS. 5A-5M show a selection of exemplary connectors.

Figure 5A:
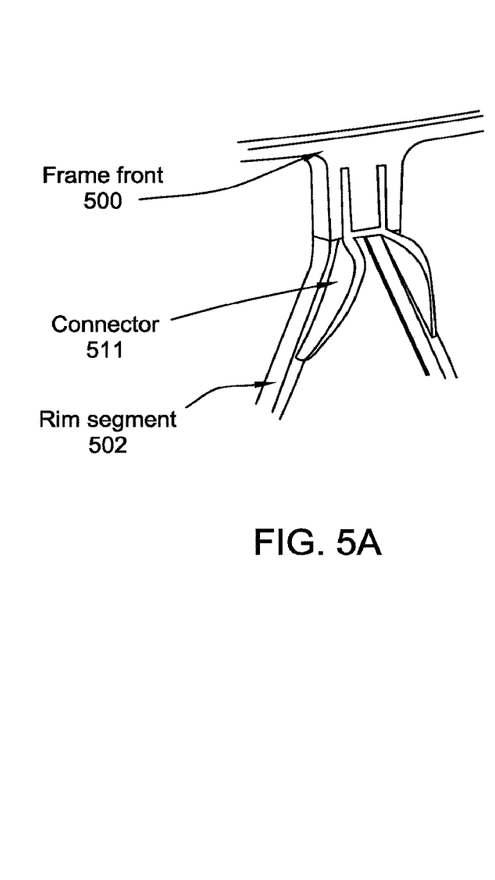
Figure 5B:
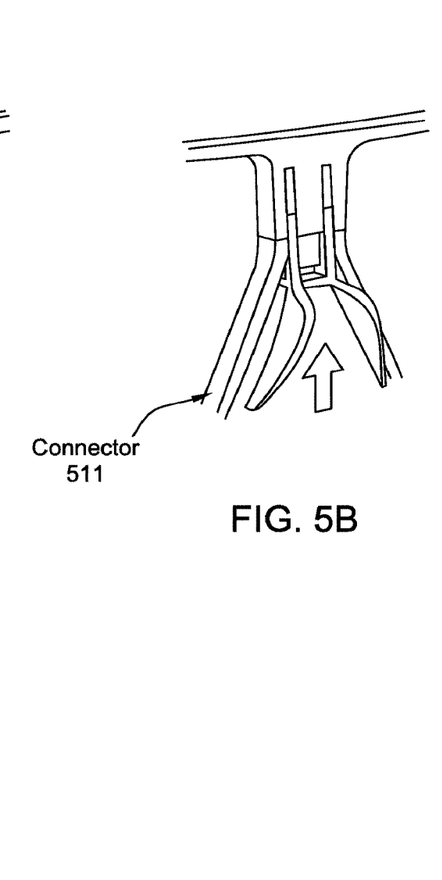
Figure 5C:
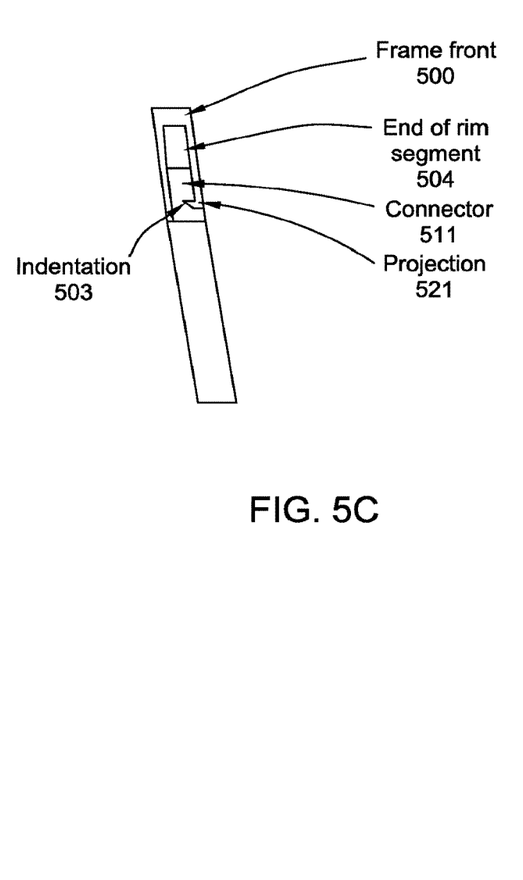

FIGS. 5A-5C show different views of a first exemplary connector that is configured to slide into an opening in a frame front, and to secure to the frame front by engaging a tooth-like projection inside the frame front. FIG. 5A shows the connector (511), frame front (500), and rim segments (502), as viewed from the side of the frame that will be closest to a user's face. In FIG. 5A, the connector (511) is engaged with the rim segment (502), and the frame (500) is held in a configuration for holding a lens in place. FIG. 5B shows the connector (511) when it is not engaged with the rim segment. FIG. 5C shows a side view of the connector when it is engaged with the rim segment and the frame (500). The end of a rim segment (504) may be free and unconnected to other structures, as in the free ends in FIG. 3A, or the end of a first rim may contact the end of a second rim. In some embodiments, the ends of the first and second rim segments are connected, so that there is a continuous one-piece bridge between the segments. The frame front (500) may comprise a projection (521), for example, a snap fit, snap finger, snap, tooth-like projection, or a lip that engages an indentation (503) such as a notch in the connector (511). When engaged, the connector (511) is held in place due to interaction of the projection (521) and the indentation (503), which, in turn, holds the rim segment (502) in a closed configuration around a lens (not pictured).

Figure 5D:
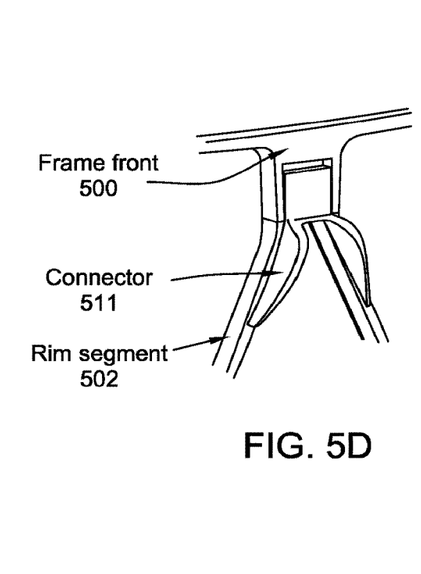
Figure 5E:
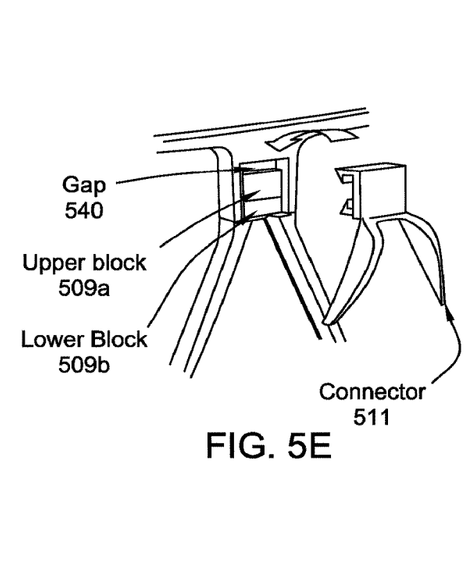
Figure 5F:
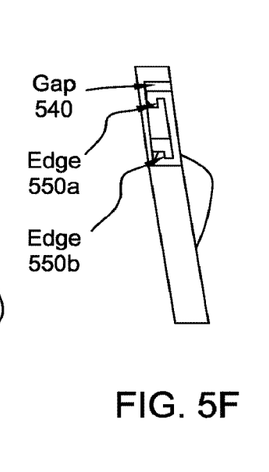
Figure 5G:
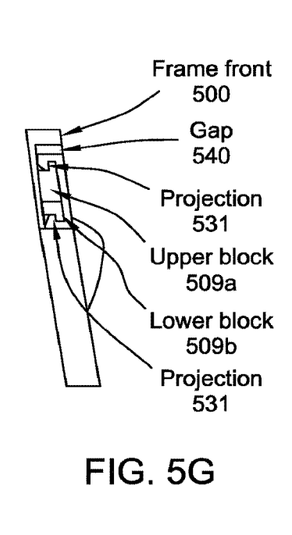

FIGS. 5D-5G show different views of a second exemplary connector that is configured to press onto a structure in the frame front. The connector comprises a c-shaped structure that surrounds a corresponding shape in the frame front. FIG. 5D shows the connector (511), frame front (500), and rim segments (502) as viewed from the side of the frame that will be closest to the user's face. In FIG. 5D, the connector (511) is engaged with the rim segment (502), and the frame (500) is held in a configuration for holding a lens in place. FIG. 5E shows the connector (511) when it is not engaged with the rim segment. In this exemplary embodiment, the frame front comprises a block structure comprising an upper block (509a) and a lower block (509b) in the bridge of the frame front. In some embodiments, the upper block (509a) is a part of the frame front and the lower block (509b) is part of the rim segments, for example, where the rim segments are connected into a one-piece structure. In some embodiments, the upper block (509a) is part of the rim segments and the lower block (509b) is part of the frame front. A small gap (540) is configured between the top of the upper block (509a) and the frame front. One or more edges of the upper block (509a) and/or the lower block (509b) are configured to be engaged by the connector (511). FIGS. 5F and 5G show a side-view of frame front (500) engaged with the connector (511). The connector (511) has projections (531) which grip around the edges (550a) and (550b) of the block. The gap (540) is configured to allow the connector sufficient space to fit around the block (509).

Figure 5H:
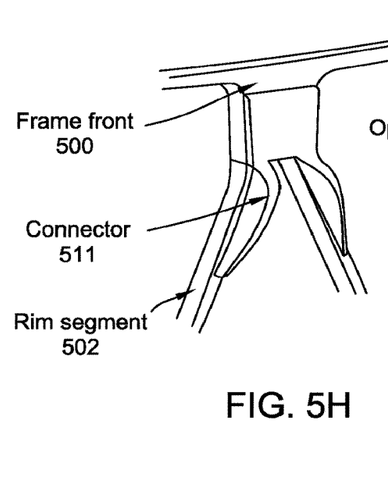
Figure 5I:
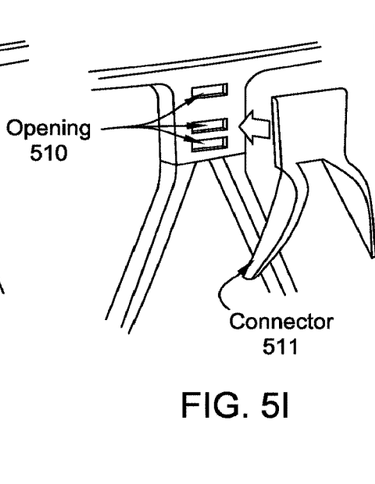
Figure 5J:
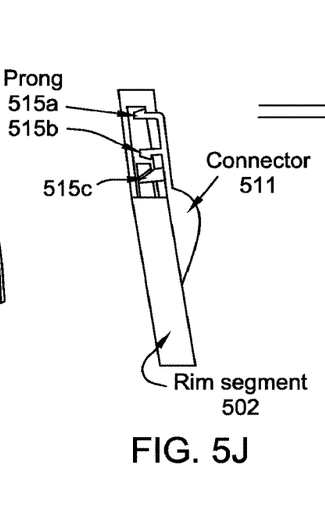
Figure 5K:
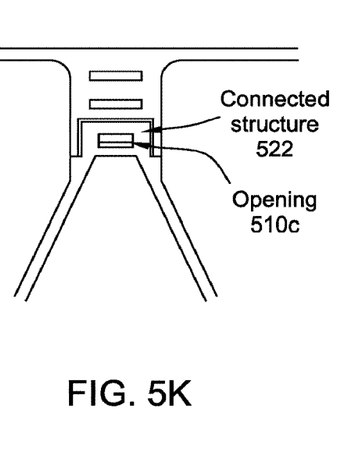

FIGS. 5H-5K show different views of a third exemplary connector that is configured to press onto a structure in the frame front. The connector comprises a three-prong structure, each of which has a different shaped prong configured to fit into a corresponding opening (510) in the frame front. In FIG. 5H, the connector (511) is engaged with the rim segment (502), and the frame (500) is held in a configuration for holding a lens in place. FIG. 5I shows the connector (511) when it is not engaged with the rim segment. FIG. 5J is a side view of the connector (511) engaged with the frame front (500) and the rim segments (502). The connector comprises prongs (515a, 515b, and 515c). In an exemplary embodiment, each prong has a different shape and may comprise a hook-like projection. Prongs 515a and 515b have hook like projections that fit into openings (510) in the frame front. Prong 515c has a chamfered edge which is configured to pull the rim segment (502) slightly upwards towards the top of the frame front for a secure fit. In some embodiments, the connector may have fewer than 3 prongs or more than 3 prongs, provided that there are corresponding openings in the frame front. In general, the rim segments in such an exemplary embodiment may be joined or connected, as illustrated in FIG. 5K. The rim segments, as a connected structure (522), are arranged around one opening 510c, so that the connector (not pictured in FIG. 5K) holds the rim segments in place when it is engaged with openings 510a, 510b, and 510c.

Figure 5L:
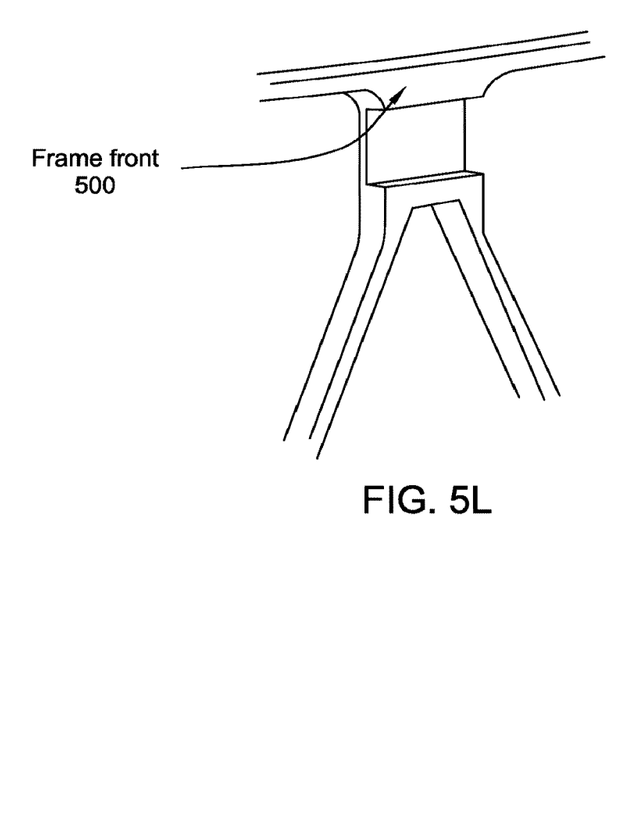
Figure 5M:
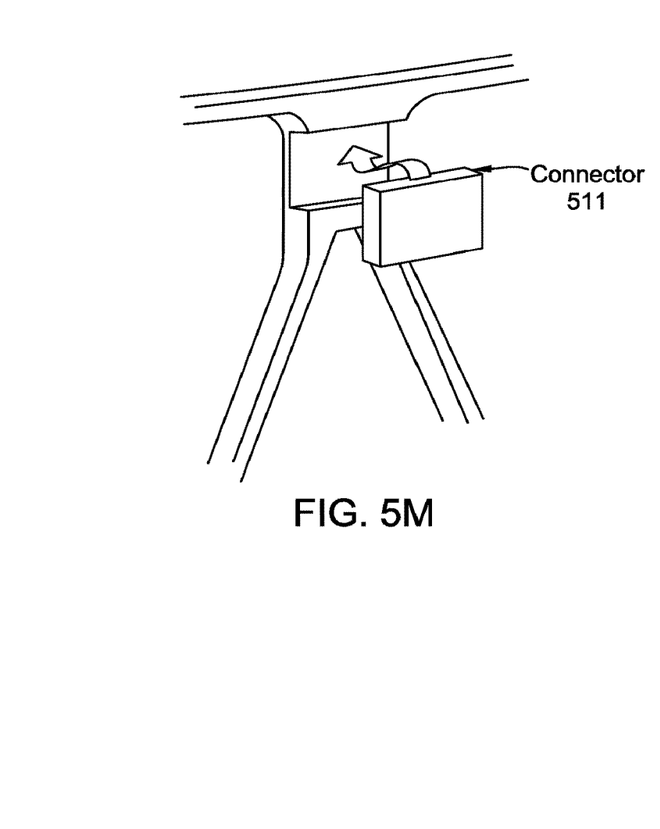

FIGS. 5L-5M show different views of a fourth exemplary connector that is configured to fit into a cut-out in the frame front. This connector may be engaged in the frame front via securing means, such as a magnet, adhesive, tension, one or more tabs on either structure, a tongue and groove joint, one or more grooves on either structure that enable sliding, and more.

The eyewear assembly described herein is suited for fast and easy insertion, removal, and exchange of lenses. In some embodiments, the connectors may be replaced or exchanged, for example, to create different color combinations or to vary the style and looks of the eyewear assembly. It is also possible to replace or exchange rim segments or portions of rim segments.

In certain aspects, lens that fit into eyewear assembly comprising a frame front and the connector mechanism described herein may be two individual, separate lenses such as a right lens through which the user's right eye looks, and a left lens through which the user's left eye looks. In eyewear with 2 separate lenses, the frame front, including rim segments, may wrap around the entire circumference of each lens. The frame front, including rim segments, may wrap around a portion of each lens. In certain aspects, the lenses may be configured as single piece lens structure instead of two separate lenses. For example, in a one-piece lens structure, the left side may be configured for a user's left eye to look through and the right side may be configured for a user's right eye to look through.

In some embodiments, the frame front and connector mechanism used herein is configured for one-piece lens structures, such as diving masks, certain googles or sports glasses. The rim segments of the frame front may be configured to extend around all or a portion of the circumference of the one-piece lens structure. The bridge of the frame front may be configured to fit on one side of the one-piece lens structure that is closest to the face of the user, so that the free ends on the rim segments may be joined to the connector and secured in a configuration that places the connector closer to the user's eyes than the one-piece lens structure. This configuration may be suitable when portions of the connector such as the second portion 410 in FIG. 4A are configured to rest against the user's nose as nosepads. In some embodiments, the one-piece lens structure is closer to the user's eyes, and the connector and rim segments are configured to rest on the other surface of the one-piece lens structure.

In some aspects, the eyewear assembly comprises one or more sensors, such as a camera, in the frame front. The eyewear assembly may be configured to reversibly hold lenses in place and/or reversibly hold the sensors in place. Lenses may be interchanged easily in the eyewear assembly and/or sensors may be interchanged. For example, a sensor may comprise a standard optical camera which may be exchanged for an IR camera, heat sensor, or ultrasound device, depending on the needs of the user. An eyewear assembly may comprise conventional lenses configured for vision or vision correction, or an eyewear assembly may comprise sensors in place of lenses. In some embodiments, an eyewear assembly may comprise conventional lenses and at least one sensor that may be configured in the frame front, for example in the bridge portion of the frame front. One or more sensors may also be present in the top bar of the frame front, in the ends of the frame front where it joins temples of the eyewear assembly (e.g., at the hinges or, for hingeless eyewear, at the transition where the frame front and temples wrap around the side of a user's head). The at least one sensor may also share the space with the conventional lenses, so that a portion of the surface of a lens is either covered by or replaced with a sensor.

In certain aspects, the eyewear assembly may comprise an imaging mechanism whereby images may be projected over the user's field of vision in one or both eyes. The imaging mechanism may project images onto the lens or lenses, or may be produced by circuitry embedded in or around the lenses. Such images may be used for augmented reality (AR). In some embodiments, the eyewear assembly may be configured to switch the user's view from normal vision to AR. In some embodiments, the eyewear assembly may be configured to switch to virtual reality (VR), for example, by closing the lenses and/or imaging mechanism either partially or fully in order to create a VR environment, or by exchanging conventional lenses or AR lenses for VR lenses.

Components of the eyewear assembly may be exchanged for different users. For example, several users may use the same eyewear assembly, but each user may have his or her own connector. This may enable several users to share a VR or AR system, for example. The connector may be sized to fit a user or group of users that have similarly proportioned faces, or the connector may be customized for an individual user. In some embodiments, standard sized frame fronts may be manufactured in a limited number of sizes, while the connector may be sized and configured for a custom fit on an individual user. In certain embodiments, both frame fronts and connectors may be fitted to individual users, either by combining standard sizes of both components until the best possible fit is achieved, or by creating custom bespoke frame fronts and connectors based on measurements of the user's face and head.

What is claimed is:

1. An eyewear assembly comprising:
   a frame front comprising two rim segments and an opening, wherein each rim segment comprises a notch and a free end, and wherein each rim segment is configured to move between at least two positions comprising:
      a first open position in which the rim segment is configured for removal or insertion of a lens, and
      a second closed position in which the rim segment is configured for holding the lens in place; and
   a connector comprising two beams, each beam having a first end, a second end, and a lip, wherein:
      the two beams are coupled to each other at their first ends;
      the two beams are configured to reversibly hold the two rim segments of the front frame in the second closed position by engaging the lip on each beam with the notch on each rim segment; and
      the opening is configured to receive a portion of the connector and a portion of each of the two rim segments.

2. The eyewear assembly of claim 1, wherein the frame front is a single, one-piece object.

3. The eyewear assembly of claim 1, wherein the frame front further comprises two interior ledges that are complementary to a surface on each of the free ends of the two rim segments.

4. The eyewear assembly of claim 3, wherein the surface on each of the free ends is configured to press against each of the two interior ledges when the two rim segments are positioned in the second closed position.

5. The eyewear assembly of claim 3, wherein the surface on each of the free ends is angled.

6. The eyewear assembly of claim 1, wherein the two rim segments are configured to move independently of each other from the first open position to the second closed position.

7. The eyewear assembly of claim 1, wherein the two beams of the connector are configured to move towards one another when pressure is applied in a medial direction to at least one of the two beams.

8. The eyewear assembly of claim 7, wherein pressure applied in the medial direction causes the lip on each of the two beams to disengage from the notch on each of the two rim segments, thereby releasing the two rim segments of the frame front from the second closed position.

9. The eyewear assembly of claim 1, wherein each of the two beams comprise a first portion and a second portion.

10. The eyewear assembly of claim 9, wherein the first portion comprises a groove extending along at least a part of its length.

11. The eyewear assembly of claim 10, wherein the second portion is configured to form a nosepad.

12. The eyewear assembly of claim 1, comprising a securing means on at least one of the two beams or on the rim segments, wherein the securing means are configured to secure the two beams to sides of the rim segments.

13. The eyewear assembly of claim 12, wherein the securing means comprises a protrusion on each one of the two beams or on the rim segments, the protrusion being configured to block further lateral movement of the two beams.

\* \* \* \* \*